March 27, 1962 F. X. BAYER 3,026,582
COMPOSITE GLASS SHEET
Filed Feb. 4, 1959
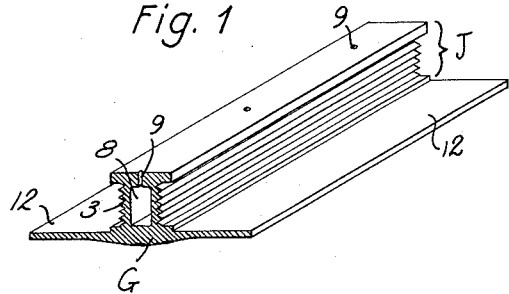
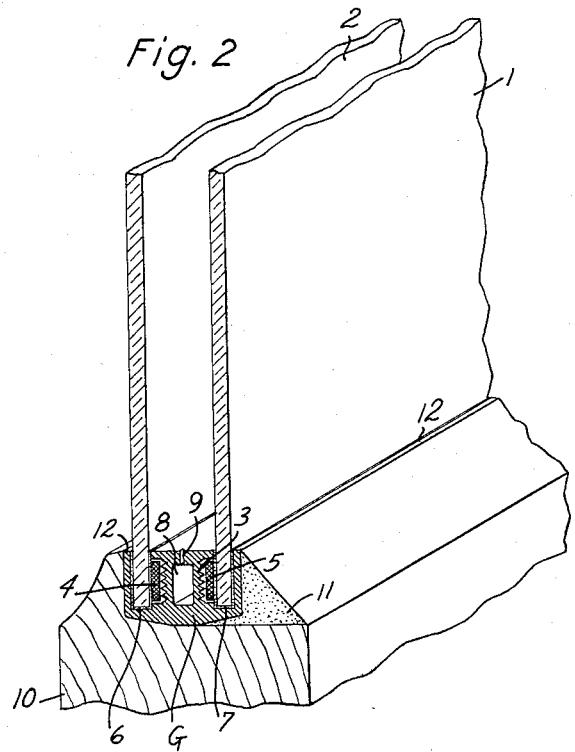
INVENTOR.
Franz Xaver Bayer
BY
Michael S. Striker
ATTORNEY United States Patent Office 3,026,582
Patented Mar. 27, 1962

3,026,582
COMPOSITE GLASS SHEET
Franz Xaver Bayer, 5 Friedhofstrasse,
Elzach, Baden, Germany
Filed Feb. 4, 1959, Ser. No. 791,197
2 Claims. (Cl. 20—56.5)

This invention relates to composite glass sheets, and more specifically to a composite glass sheet comprising two or more spaced glass sheets firmly connected together at their edges.

Composite glass sheets of this kind are well known in the art. An object of the invention is to provide a composite glass sheet of this kind which can be manufactured easily, simply and cheaply.

Another object is to provide a composite glass sheet with a seal between the sheets which remains efficient for an indefinite period in spite of temperature differences which may occur, such temperature differences giving rise to highly disadvantageous internal tensions in conventional composite sheets.

Still another object of the invention is to provide a composite glass sheet in which the seal remains efficient over a very long period in spite of relatively large differences in the thicknesses of the glass sheets caused by inequalities arising during manufacture.

A further object of the invention is to provide a composite glass sheet construction suitable for use with ornamented glass sheets with the ornamented faces of the sheets directed towards the interior of the composite sheet to protect them from dust.

Yet another object of the invention is to provide a composite glass sheet in which the sheets are spaced by a spacer member which can take up all the stresses which necessarily arise during the manufacture of the composite sheet.

These objects are attained in the present invention by the provision of a composite glass sheet which comprises at least two spaced glass sheets connected together round the periphery thereof in an airtight manner by means of at least one synthetic plastic profiled member with a T-shaped cross section which includes a pair of arms and an upright forming a bridge member with a width determining the spacing of the sheets, and a plastic sealing member between the bridge member and an adjacent surface of each of the glass sheets.

The synthetic plastic profiled member for sealing the glass sheets together to give the composite sheet fulfills the objects of the invention in a very satisfactory manner. It is a one-piece structure which allows the glass sheets to be framed in a single operation without the necessity of inserting additional spacing members between the sheets, which spacing members would scarcely be equal to the pressure arising during framing to seal the sheets. As no additional spacing members are necessary, it is also possible for glass sheets of any desired round form likewise to be formed into composite sheets in a simple manner.

It is particularly advantageous for the bridge member of the synthetic plastic frame itself to have a T-shaped profile in such a way that between this bridge member and the glass sheet on each side of this bridge member there is a recess for the reception of a plastic-elastic interlayer which seals under pressure. A profile of this shape also gives increased strength, which is very important in view of the lateral pressure to which the bridge member is subjected during pressing of the whole frame.

Further features of the invention will become apparent from the following description of a preferred embodiment of the invention shown in the accompanying diagrammatic drawing, in which:

FIG. 1 is a perspective view of a synthetic plastic profiled member for the production of a composite glass sheet, and FIG. 2 is a perspective view, partly in section, of a composite glass sheet including a profiled member as shown in FIG. 1.

FIG. 1 shows a profiled member made out of thermoplastic synthetic plastic, for example polyvinyl chloride, and having a T-shaped profile G with free arms 12 and an upright which is in the form of a bridge member 3 which itself has a T-shaped profile J.

As is shown in FIG. 2, the arms 12 of the T-shaped profiled member 3 form, in the completed composite sheet, a cover round the edges of a pair of glass sheets 1 and 2 and are bent round the edges so as to lie along the external surfaces of the pair of sheets, whereas the bridge member 3 of the profiled member lies between the pair of sheets and separates them by any desired distance.

The result of the bridge member 3 itself having a T-shaped profile is that there is a recess between this bridge member and the glass sheet on each side of the bridge portion; in each of these recesses it is possible to have an elastic sealing band 4, 5 accommodated which constantly remains plastic, gives a pressure which results in sure sealing and can follow tensions caused by heat and be in no way influenced by these changes over a period of time. It is also possible, as shown in FIG. 2, for an adhesive 6, 7 to be applied to bond the synthetic plastic firmly to the glass at the edges of the sheets. To give a better grip, the inner surface of each of the recesses can be roughened.

The bridge member 3 defines a longitudinal space 8 which is in communication via bores 9 with the space between the two glass sheets 1 and 2. The space 8 serves for the reception of hygroscopic material which absorbs any moisture in the space between the glass sheets 1 and 2 and prevents misting of said sheets.

Bonding of the various parts of the composite glass sheet in a firm manner is achieved by inserting the bridge member 3 between the glass sheets 1 and 2 and then bending the arms 12 of the T-shaped profile G of the profiled member, with the use of heat and pressure, round the outer edges of the glass sheets and then pressing the arms 12 against the sheets in a sealing manner. In this way pressure is exerted on the constantly plastic elastic sealing bands 4 and 5 to give sealing. The sealing bands 4 and 5 can yield to give sufficient play to allow for large differences in temperature, and allow for unevenness in ornamental glass without the sealing action being deleteriously effected. The adhesive 6, 7 ensures that the arms 12 are securely held against the sheets 1 and 2. The bridge member 3 is strongly made, and has an upwardly widened profile which readily takes up without damage forces on it arising during pressing of the arms 12. This strongly made bridge member is not damaged by heating up during the pressing operation.

As will be seen from FIG. 2, the composite glass sheet can be inserted in a rabbet in a window frame 10 just like a simple glass sheet. This is done by pushing the composite sheet from the right into the rabbet and firmly securing it by means of a putty fillet 11. Owing to the plastic nature of the synthetic plastic material of which the bridge member 3 is composed, it is, however, possible for the putty fillet 11 to be replaced by a simple wooden fillet, since such a wooden fillet gives adequate sealing.

It is also possible for the composite glass sheet to be bonded directly to the window frame 10 from outside, or, when the frame consists of thermoplastic material, for the composite sheet to be welded to the frame.

When it is desired for three or more individual glass sheets to be united to form a composite sheet, a profiled member will be used which correspondingly has more than one of the bridge members 3. Conveniently the profiled member is in a single piece.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. For use in a window, an assembly of a monolithic elongated member of substantially T-shaped cross-section having a monolithic substantially central leg portion provided with a substantially rigid outer peripheral portion and an opposed substantially rigid inner peripheral portion of substantially the same width as said outer peripheral portion, said leg portion being formed with longitudinally extending recesses in its opposite side faces, and having a pair of bendable wall portions integrally connected with and extending laterally from opposed sides of said outer peripheral portion, the thickness of said bendable wall portions being smaller than the thickness of said rigid outer and inner peripheral portions of said central leg portion; and sealing strips of resilient sealing material located in said recesses in said opposite side faces of said central leg portion, whereby a pair of sheets of transparent material may be placed against said opposite side faces of said central leg portion in contact with said sealing strips in said recesses therein and abutting against said inner and outer rigid peripheral portions of said central leg portion and said bendable wall portions may be bent around the edges of said sheets to firmly hold the latter against said sealing strips and said inner and outer rigid peripheral portions of said central leg portion of said monolithic elongated profiled member.

2. An assembly as recited in claim 1 and wherein said leg portion has roughened surfaces at said recesses thereof.

References Cited in the file of this patent

UNITED STATES PATENTS

| | | |
|---|---|---|
| 2,189,388 | Zand | Feb. 6, 1940 |
| 2,525,717 | Ottenheimer | Oct. 10, 1950 |
| 2,587,063 | Petsch | Feb. 26, 1952 |
| 2,834,999 | Taylor et al. | May 20, 1958 |